Sept. 5, 1961   M. TRESHOW   2,999,059
NUCLEAR REACTOR
Filed April 4, 1958   6 Sheets-Sheet 1

Fig-1

INVENTOR.
Michael Treshow
BY
Roland A. Anderson
Attorney

Sept. 5, 1961     M. TRESHOW     2,999,059
NUCLEAR REACTOR Filed April 4, 1958     6 Sheets-Sheet 2

Fig-3

INVENTOR.
Michael Treshow
BY
Roland A. Anderson
Attorney

Sept. 5, 1961     M. TRESHOW     2,999,059
NUCLEAR REACTOR

Filed April 4, 1958     6 Sheets-Sheet 3

INVENTOR.
Michael Treshow
BY
Roland A. Anderson
Attorney

Sept. 5, 1961 M. TRESHOW 2,999,059
NUCLEAR REACTOR
Filed April 4, 1958 6 Sheets-Sheet 5

INVENTOR.
*Michael Treshow*
BY
*Roland A. Anderson*
Attorneys

Sept. 5, 1961

M. TRESHOW 2,999,059

NUCLEAR REACTOR

Filed April 4, 1958

INVENTOR.
Michael Treshow

BY

Roland A. Anderson

Attorney

United States Patent Office 2,999,059
Patented Sept. 5, 1961

2,999,059
NUCLEAR REACTOR
Michael Treshow, Downers Grove, Ill., assignor to the United States of America as represented by the United States Atomic Energy Commission
Filed Apr. 4, 1958, Ser. No. 726,592
5 Claims. (Cl. 204—193.2)

This invention relates to nuclear reactors, to means for controlling nuclear reactors and more particularly to means for controlling reactors of the boiling moderator type.

The discovery of the boiling moderator reactor with its attendant natural stability, as disclosed in the patent application to Samuel Untermyer, Serial No. 518,427, filed June 28, 1955, now U.S. Patent No. 2,936,273, issued on May 10, 1960, has made a significant contribution to the art of nuclear reactors and especially to the art of nuclear reactors designed for the purpose of producing useful energy. Samuel Untermyer found that, under certain conditions, reactors may be operated to produce vapor by causing the moderator within the active portion of the reactor to boil, and that the vapor so produced could be directly used to perform useful work. He found that under certain conditions, the formation of voids in the moderator in the form of vapor bubbles resulting from neutron flux excursions from the injection of a reactivity increment into the reactor operates to nullify the reactivity increment within a sufficiently short period of time to prevent unsafe reactor operating conditions from developing. A reactor behaving in this manner is self-regulating and utilizes an inherent physical property, namely the void formation, to offset changes in reactivity which are injected into the reactor.

The increase of voids within the moderator in the active portion of the reactor reduces the volume ratio of the moderator to fissionable material within the active portion with one or more of the following effects depending upon the particular construction of the reactor.

(1) The decrease in the volume ratio will reduce the moderating effect of the liquid and hence the neutron flux within the reactor will have a higher energy. As a result, the probability of a given neutron within the active portion of the reactor escaping from the active portion is increased and, hence, leakage from the reactor is increased.

(2) Since the increased temperature from the higher power and the decreased density of liquid moderator results in a higher average neutron energy within the reactor, there will be a higher neutron resonance absorption in any U-238 present in a thermal reactor.

(3) The decrease in the moderator to fissionable material volume ratio decreases the probability of neutron absorption in the moderator itself.

(4) In reactors having fuel bodies the increased temperature of the fissionable material bodies within the reactor as a result of the higher power level causes thermal expansion of the fuel bodies. This factor tends to increase neutron leakage and if U-238 is present this factor also tends to increase the resonance absorption of neutrons by reducing self-shielding in the fuel bodies.

In the reactors disclosed in the aforementioned application to Samuel Untermyer, operator control is effected by means of control rods containing neutron-absorbing materials. The control rods are set to a predetermined level corresponding to the amount of power desired to be generated and the self-regulating nuclear reaction within the core will raise to, and level off at, the desired energy level. The use of control rods necessitates the use of complicated mechanisms for translating the rods and very reliable pressure seals through which the rods may be translated in order to prevent liquid and vapor leakage from the pressure shell of the reactor. Reactor control rod drive mechanisms and high pressure seals are necessarily high expense items which add materially to the capital costs of the reactor. The maintenance problems related to the highly complex mechanical drive systems and pressure seals are also extensive, especially in view of their exposure to radioactivity emanating from the nuclear reaction within the active portion. These factors add materially, of course, to the operating expenses of the reactor system.

Control rods containing neutron-absorbing materials such as cadmium and boron are also uneconomical means for controlling the reactor operating level for reasons not attendant to their mechanical complexities. The control rods hereinbefore used operate to control the nuclear reaction by absorbing neutrons in neutron-absorbing materials and hence reduce the number of neutrons available in each generation for producing more fissions. The neutrons absorbed in the control rods merely operate to convert the absorbing elements therein to new isotopes which generally serve no useful purpose. The neutrons which are so absorbed are lost for any further useful purpose and may not be recovered for further use in propagating fissioning or in producing additional fissionable isotopes from fertile materials. It will be noted that by increasing the voids or decreasing the moderator to fissionable material volume ratio within the active portion of the reactor the average energy of the neutrons present therein is raised, thereby increasing the neutron resonance absorption in any breeder materials, such as U-238, present in the reactor active portion. If the nuclear reaction is controlled by selectively controlling the amount of voids or the volume ratio of the moderator to fissionable material within the active portion the excess neutrons may be put to the useful purpose of creating new fissionable materials rather than being lost in absorption in control rod materials.

It is therefore an object of this invention to provide a boiling moderator nuclear reactor in which the power level may be controlled by directly varying the volume ratio of the liquid moderator to fissionable material within the active portion thereof.

It is another object of this invention to provide a nuclear reactor which dispenses with the complexities of a mechanically driven control rod system.

A further object of this invention is to provide a nuclear reactor which greatly reduces the inefficient absorption of excess neutrons in the materials comprising the control system.

These and further objects of the present invention will be more fully understood from a further reading of the present specification particularly in the light of the accompanying drawings in which.

The objects and advantages of this invention are best accomplished in a nuclear reactor comprising a pressure shell containing a steam-forming coolant-moderator, and a mass of fissionable material disposed in a geometric lattice arrangement submerged in the coolant-moderator so that the volume ratio of the coolant-moderator to the fissionable material is insufficient to yield an effective neutron multiplication factor of unity. Control tubes are spaced within the geometric lattice, the tubes containing a controllable volume of liquid control-moderator material so that the volume ratio of the coolant-moderator and the control-moderator to the fissionable material is sufficient to yield an effective multiplication factor greater than unity and a negative reactivity to core void coefficient when the tubes are filled with the control-moderator.

One embodiment of the present invention is shown in the accompanying drawings and is described in the specification hereinafter which discloses a neutronic reactor designed for a central station power plant having an electrical power output of approximately 325 megawatts. The reactor shown is a heavy water boiling and superheating reactor in which coolant-moderator flows through the reactor by natural convection and uses slightly enriched fuel.

REACTOR

Figure 1:
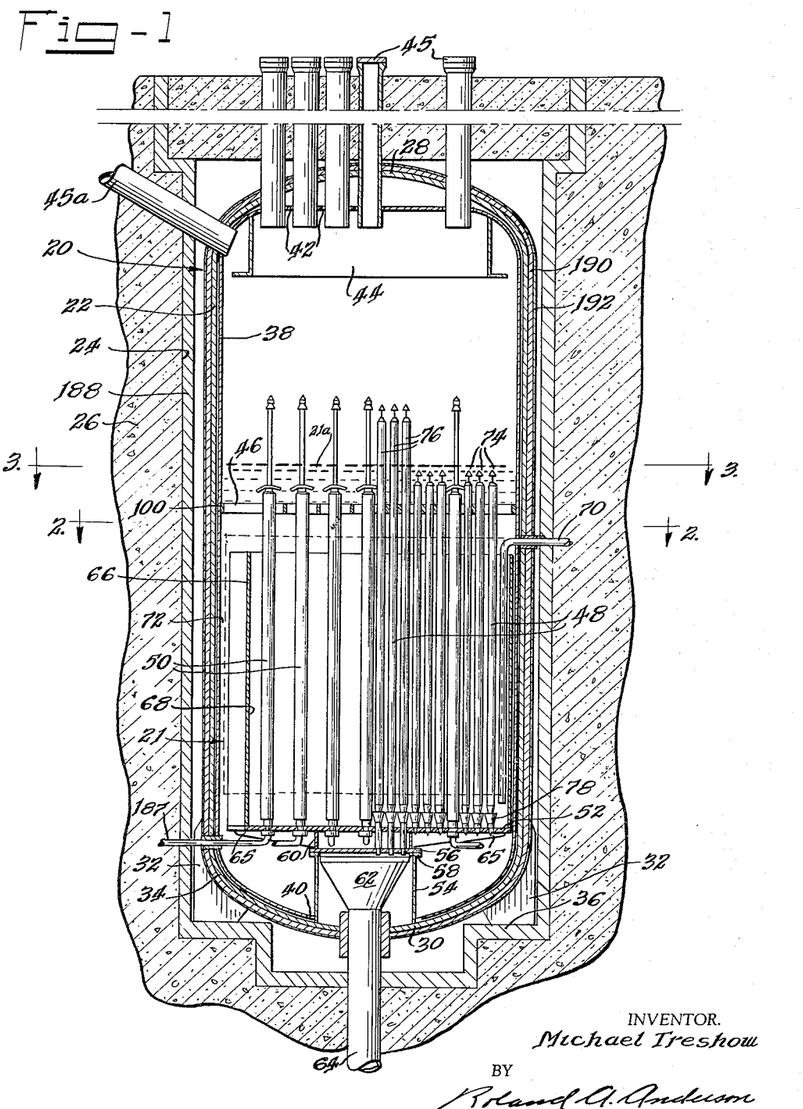
FIG. 1 is a vertical section view taken along the line 1—1 of FIG. 2 showing the arrangement of the reactor system.

The reactor 20 as shown in FIG. 1 has an active portion 21 submerged in coolant-moderator 21a within a pressure tank 22 disposed in a cell 24 formed by a concrete shield 26. The pressure shell 22 is elongated and cylindrical with each end having a dome-shaped head 28 and 30. The pressure tank 22 is supported within the cell 24 by means of twelve supports 32 welded to the tank 22 at the knuckle portion 34 at the lower end of the tank and resting upon the shoulder 36 formed at the bottom of the cell.

The inside tank diameter is 16 feet with a total inside height of 40 feet. The tank is fabricated of high grade carbon steel approximately five inches thick to withstand an operating pressure of about 725 p.s.i. and a wall temperature of 600° F. Heavy water is used for the coolant-moderator 21a. The inside of the pressure shell 22 is clad with stainless steel to prevent corrosion and other steam damage.

The pressure shell is protected against overheating due to gamma absorption by means of a two-inch thick boron-containing steel shell or thermal shield 38 installed inside the pressure shell 22. The thermal shield 38 lines the inside wall of the pressure shell 22 with a clearance of approximately one inch therebetween so that coolant may flow from the inside of the reactor through ducts 40 in the bottom of the thermal shield 38. Ducts 42 penetrate the top of the thermal shield to equalize the pressure of the reactor interior and the interstice between the thermal shield 38 and the pressure shell 22. A cylindrical baffle 44 is axially disposed at the top of the thermal shield 38 and sealed thereto to aid in separating out water remaining in the steam. There are 50 access ports 45 through the upper head 28 which are used for loading the reactor as hereinafter described. A steam outlet 45a enters the pressure shell 22 at the knuckle portion near the top end for the removal of saturated steam if so desired.

A grid 46 is located transversely across the midportion of the pressure shell 22 approximately 18 inches above the active portion 21 and forms an upper lateral support for the fuel elements 48 and the control tubes 50 hereinafter described. A second grid 52 is located near the bottom of the pressure shell 22 approximately 18 inches from the bottom of the active portion 21 and forms a lower support for the fuel elements 48 and control tubes 50. A cylindrical member 54 is sealed at its bottom end to the inside surface of the pressure shell 22 coaxially therewith and supports a plate 56 at its upper flanged end 58. A second member 60, hexagonally shaped, is sealed to the top of the plate 56 and to the bottom of the lower support grid 52 coaxially with the pressure shell 22. The chamber formed by the inside of the cylindrical member 52 and the plate 56 houses a funnel-shaped plenum 62 which connects with a superheated steam outlet pipe 64 extending through the bottom of the pressure shell 22.

The lower grid 52 is centrally supported by the structure comprising the cylindrical member 54, plate 56 and hexagonal member 60. The grid is formed of 1¾-inch stainless steel and has radial ribs 65 on the underside to structurally strengthen it, as it supports most of the weight of the components forming the active portion 21.

A large tubular member 66 is supported by the lower grid 52 around the periphery thereof and forms a tank 68 for cold moderator coolant as it is first introduced into the reactor 20 through six equally spaced coolant-moderator inlet pipes 70 extending through the pressure shell 22 to the bottom of the tank 68. The tubular member 66 is fabricated of 9/16 inch Zircaloy II and is shaped to form downcomer passages 72 (FIG. 2) for the coolant-moderator as it overflows the tank 68. Zircaloy II is an alloy containing 98.2 w/o zirconium, 1.5 w/o tin, .15 w/o iron, .05 w/o nickel and .10 w/o chromium. The lower support grid 52 is shaped to conform with the shape of the tubular member 66 so that there is no restriction to the downward flow of the coolant-moderator. The tubular member 66 has an outermost diameter of approximately 14 feet so that there is a minimum passage for coolant-moderator between the tank and the thermal shield 38 of approximately nine inches. The upper edge of the tank 68 extends to a level of approximately six inches below the top of the active portion 21.

ACTIVE PORTION

Figure 2:
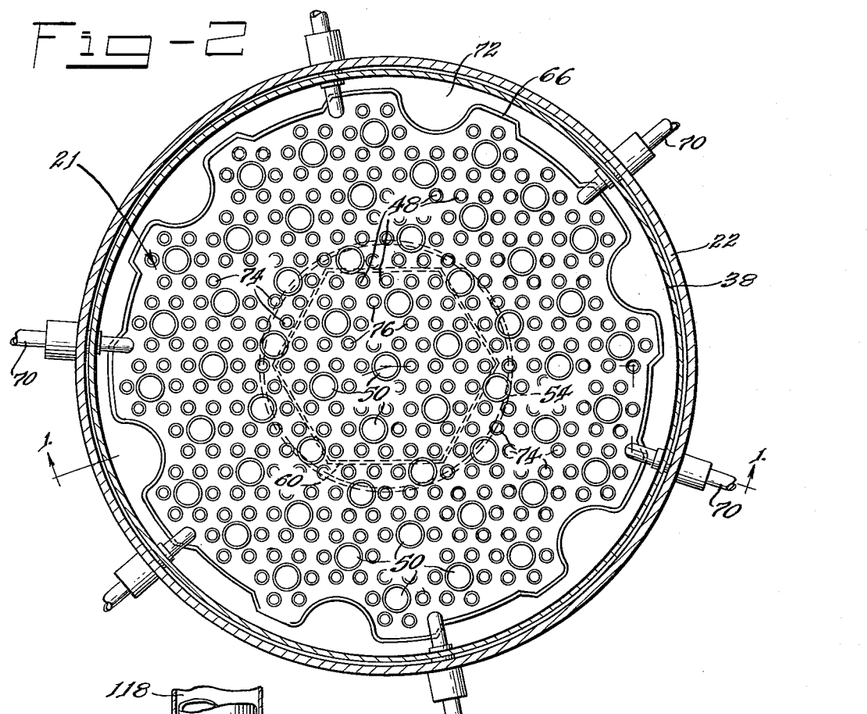
FIG. 2 is a horizontal section view taken along the line 2—2 of FIG. 1 and shows the geometric lattice arrangement of the active portion within the reactor.
Figure 3:
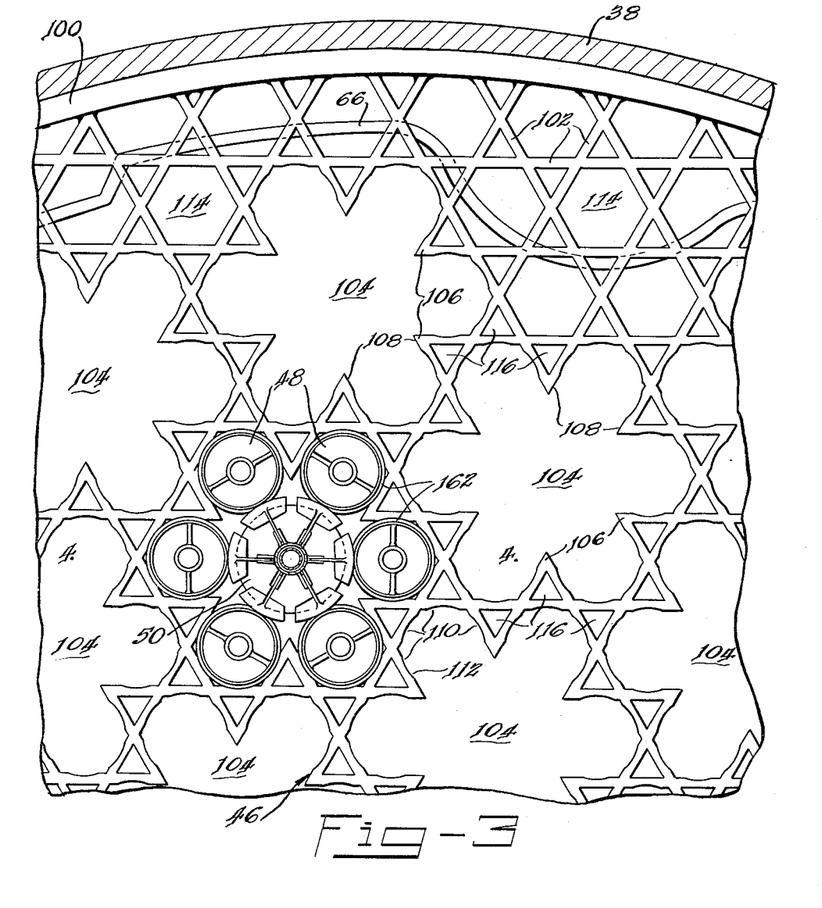
FIG. 3 is an enlarged, fragmentary, horizontal section view taken along the line 3—3 of FIG. 1 showing the upper support grid structure and the arrangement of elements supported therein.

The active portion 21 is contained within the tank 68 and is made up of the fuel elements 48 and the control tubes 50 submerged in the coolant-moderator 21a and arranged with a hexagonal lattice spacing of eight inches between centers as shown in FIGS. 2 and 3. There are six fuel elements 48 for each control tube 50 and are hexagonally arranged therearound so that the center-to-center distance between control tubes is 21.166 inches. There are 330 fuel elements 48 and 55 control tubes 50 within the active portion 21 of the reactor. It will be noted in FIG. 1 that the outermost fuel elements 48 are somewhat shorter than the innermost fuel elements. The 276 shorter fuel elements in the outer portion of the active portion 21 will hereinafter be referred to as boiling fuel elements 74 whereas the 54 longer fuel elements in the center will be referred to as superheating fuel elements 76. Further reference to fuel elements 48 will be used as hereinbefore to designate all fuel elements regardless of position.

Figures 4, 8:
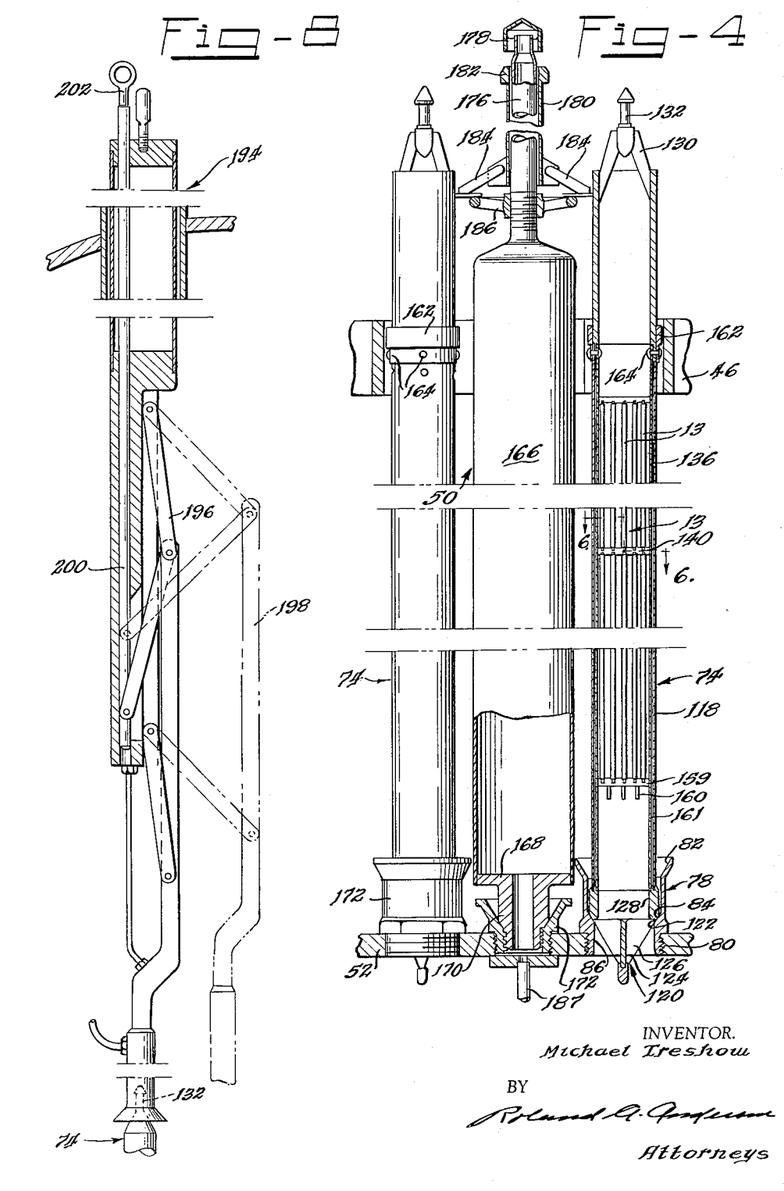
FIG. 4 is a vertical section view in part taken along the line 4—4 of FIG. 3 showing a control tube and two of its surrounding boiling fuel elements.
FIG. 8 is an elevation view of a fuel handling tool for use with the disclosed nuclear reactor.

The lower support grid maintains the full weight of all of the boiling fuel elements 74 which rest in adapters 78 threadedly engaging apertures 80 in the lower grid as shown in FIG. 4. Each adapter 78 has a flanged upper end 82 to facilitate the placement of a boiling fuel element 74 as it is lowered into place. A conical seat 84 supports the fuel element 74 and a passage 86 is provided through the adapter 78 so that coolant-moderator may pass upward therethrough into the boiling fuel element 74.

Figure 5:
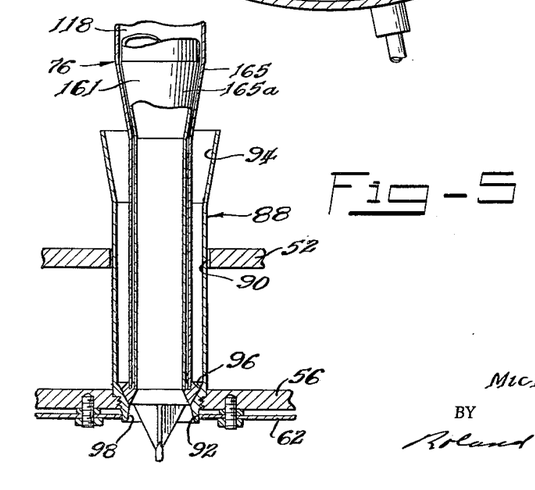
FIG. 5 is a fragmentary, vertical section view of the lower end of a superheating fuel element.

The superheating fuel elements 76 are supported by adapters 88 as shown in FIG. 5, each of which extends through an aperture 90 in the lower support grid 52. Each adapter threadedly engages the plate 56 below the lower grid support and extends into the steam outlet plenum 62 through an aperture 92 therein. Each adapter 88 also has an outwardly extending flange 94 at its upper end to facilitate the placement of the superheating fuel element 76 thereinto. A conical seat 96 is also provided within each adapter to support the weight of the fuel elements and a passage 98 is provided therethrough for superheated steam to pass from the interior of the superheating fuel elements 76 into the steam outlet plenum chamber 62.

UPPER SUPPORT GRID

The upper support grid 46 is used for lateral support only and does not carry any of the weight of the fuel elements or control tubes. It comprises a flat ring 100 surrounding a framework 102, the flat ring 100 being welded to the inside wall of the thermal shield 38 as shown in FIG. 3. The framework 102 defines large, essentially hexagonally shaped openings 104 with triangular projections 106 in the central portion of each flat side of the hexagonal opening pointing toward its center. The confronting sides 108 of adjacent triangular projections 106 are parallel and equal in length. The parallel sides of adjacent triangular projections 106, as well as the included sections of the flat sides of the hexagonal opening 104, between the parallel sides, have indentations 110 which together describe a circular arc 112 slightly greater than 180° to serve as lock supports for the fuel elements 48 fitted therein. Around the periphery of the framework 102 are a series of smaller hexagonal and triangular openings 114 and 116, respectively, which serve to facilitate the flow of moderator coolant through the upper grid 46.

The framework 102 is adapted to laterally space the fuel elements at an eight-inch center-to-center distance. It will be noted that the control tubes 50 do not receive any direct support from the grid 46 but rather are indirectly supported by means of the fuel elements 48 immediately surrounding them. The upper grid 46 is fabricated of stainless steel and is approximately six inches thick with the individual bars therein measuring approximately ½ inch.

BOILING FUEL ELEMENTS

The fuel elements 74 making up the boiling portion of the active core each comprises an outer shroud 118 with a tip 120 welded to its lower end. The tip 120 has a conical surface 122 conforming to the seat 84 in the adapter 78 and forms a more or less tight seal therewith. The tip 120 has a pointed extension 124 with triangular webs 126 which serves to guide the fuel element 74 into the adapter 78 when the reactor is being loaded. The tip 120 has an orifice 128 through which coolant-moderator may flow from beneath the lower grid 52 into the fuel element 74.

The upper end of the shroud 118 is open and extends above the top of the upper support grid 46. It has a webbed end-piece 130 with a specially shaped knob 132, for engagement with a fuel handling tool which will be hereinafter described. The outer shroud 118 is formed of Zircaloy II and has an outer diameter of 6.38 inches. The inside diameter of the outer shroud 118 is approximately 6.30 inches in that part extending between the upper and lower grids 46 and 52, respectively. It will be noted that the upper end of the shroud 118 extending above the upper grid is somewhat thicker having an inside diameter of approximately 6.20 inches.

FUEL PIN ASSEMBLIES

Figure 7:
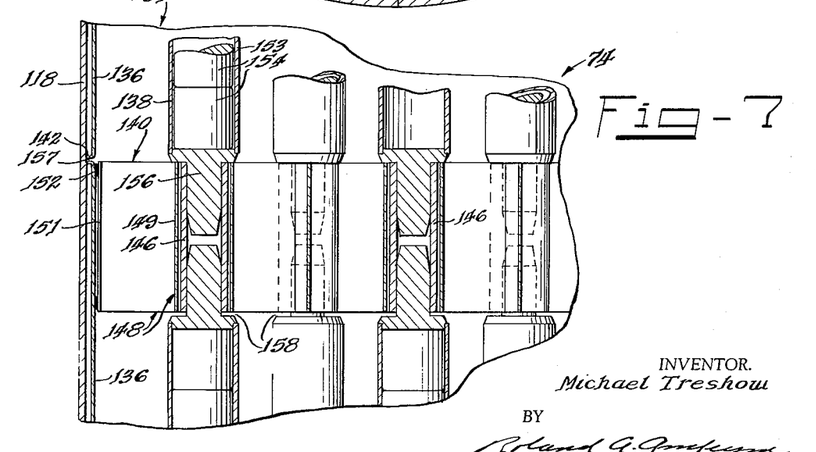
FIG. 7 is a fragmentary vertical section view taken along the line 7—7 of FIG. 6 and shows in detail the construction of a fuel element.
Figure 9:
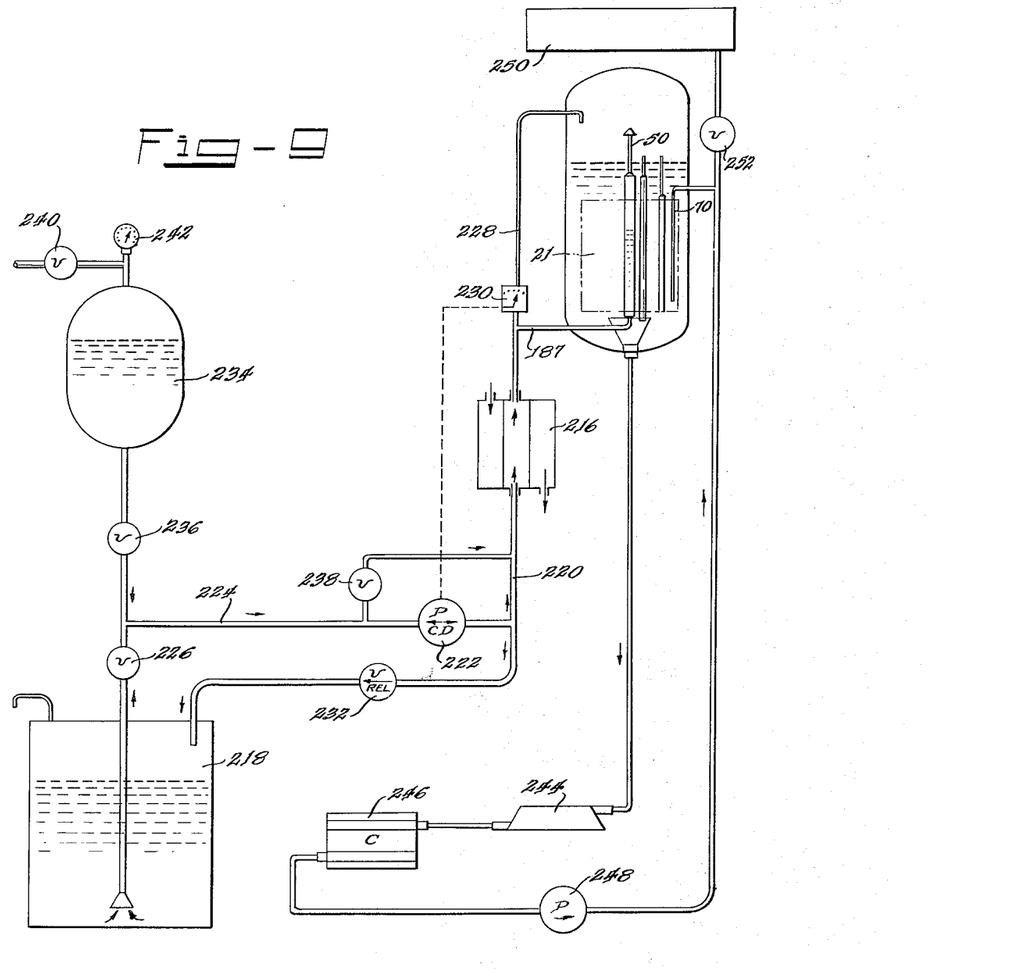
FIG. 9 is a diagrammatic view of the control system and steam cycle associated with the nuclear reactor.

Within the outer shroud 118 are six fuel pin assemblies 134 stacked one on top of another which form the upper and lower boundaries of active portion 21 of the reactor. Each assembly 134 comprises an inner shroud 136, 85 fuel pins 138 and a fuel pin support grid 140 (FIGS. 4 and 7). The inner shroud 136 is a thin tubular member having its ends folded over to form small flanges 142 which serve to keep the inner shroud 136 spaced from the outer shroud 118 when inserted therein, the space between containing stagnant coolant-moderator to serve as a thermal insulator. The inner shroud 136 of each boiling fuel element 74 is fabricated of Zircaloy II tubing having an inside diameter of approximately 6.20 inches and a thickness of approximately .02 inch.

Figure 6:
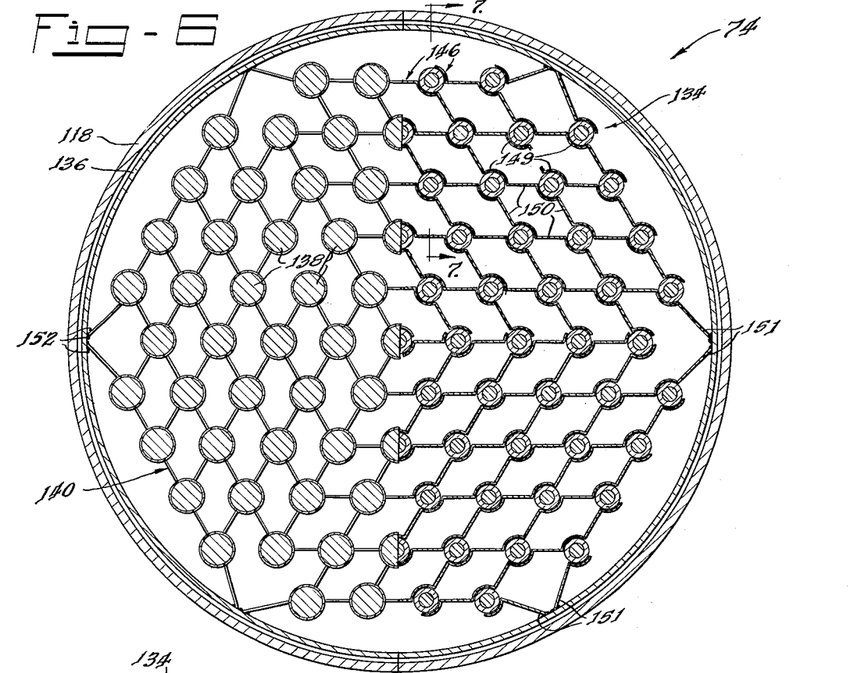
FIG. 6 is a horizontal section view taken along the line 6—6 of FIG. 4 showing the lattice arrangement of fuel pins and support grid structure in a fuel element.

The grids 140 support the fuel pins 138 in a hexagonal lattice spacing of .60 inch by means of bushings 146 welded to specially shaped Zircaloy II webs 148 (FIG. 6). The webs 148 are zigzagged in shape and have arcuate portions 149 between adjacent straight portions 150 which embrace the bushings 146 and are spot welded thereto. Short portions of webbing 151 extend from the lattice to the inner shroud and are spot welded thereto as shown at 152 in FIGS. 6 and 7. As will be seen in FIG. 6, the outer diameter of the bushing 146 plus the thickness of the webbing 148 at its arcuate portions 149 is somewhat less than the outer diameter of the tubular member 153 forming the sheathing of the fuel pins 138. The grid is so designed to compensate for the cross sectional area of the straight portions 150 of the webbing 148. Thus, the total cross sectional area of the space within the inner shrouds is approximately the same at any axial portion therein so that the flow of the coolant-moderator therethrough will not be appreciably restricted.

The fuel pins 138 comprise tubular members 153 containing fuel in ceramic pellet form 154 and plugs 156 welded to each end. The plugs are adapted to be inserted in the bushings 146 of the fuel pin grid supports 140. The tubes 153 have an outer diameter of .344 inch and are formed of Zircaloy II with a wall thickness of .016 inch. The fuel pellets 154 contain uranium, approximately 1.3% enriched, in the form of $UO_2$ the pellets measuring approximately .31 inch in diameter. Each fuel pin 138 in the boiling fuel elements 74 contain approximately 297 gms. of uranium so that the total weight of uranium in the boiling portion of the active core is approximately 41,810 kgs. The overall length of each of the fuel pins 138 is approximately 28 inches so that the total length of the active portion is about 14 feet.

As stated hereinbefore, each fuel pin assembly 134 comprises an inner shroud, 136, 85 fuel pins 138 and one fuel pin support grid 140 attached to the inner shroud 136 at its upper end. The fuel pins of each assembly 134 are spaced at their lower end by means of the fuel pin support grid 140 forming a part of the assembly residing immediately below them in the fuel element. The total weight of the fuel pins of each assembly rests upon the grid support of the assembly therebelow. This weight, however, is transferred to the inner shrouds 136 through the welds 152 so that the total weight of all of the fuel pins in the fuel elements 74 does not rest on the fuel pins of the lowermost assembly but rather on its inner shroud. Thus the fuel pin distortions during operation of the reactor will be held to a minimum. It will be noted in FIG. 7 that a clearance 157 is shown between adjacent inner shrouds 136. This clearance will be taken up as the reactor is brought to operating temperature so that they will abut one another during operation. By supporting the elements on the inner shrouds in this manner, a clearance 158 may be provided between the plug 156 at the upper end of each fuel element and the bottom of the grid support 140 thereabove to allow for axial expansion of the fuel elements when heated.

The fuel pins 138 of the lowermost fuel pin assembly 134 are supported at their lower ends by means of a grid 159 which is identical to the support grids 140 hereinabove discussed. The lower support grid 159 is supported by means of bars 160 transversely disposed across the top of a lower inner shroud member 161 extending from there down to the tip 120 and fastened thereto.

A ring-like member 162 surrounds the fuel element 74 and is fastened thereto by means of rivets 164 to engage the upper support grid 48 in one of the circular arc locks supports 112.

The particular construction of the fuel element, as described, facilitates the fabrication thereof wherein the tip 120 with its lower inner shroud member 161 are held in a fixture so that the fuel pins 138 of the lowermost fuel pin assembly 134 may be inserted in the lower support grid 159. The fuel pins of the lowermost assembly are held upright by means of comb-like fixtures which will support them in a properly spaced arrangement so that a support grid 140 may be fitted into their upper ends. The inner shroud 136 of the lowermost assembly is then slid over the grid and fuel pins and spot welded to the support grid 140. The fuel pins of the next assembly above are then placed in the top of the grid 140 and the process repeated until six assemblies have been so stacked. The outer shroud 118 is then slid over the stacked assemblies 134 and welded to the tip 120.

SUPERHEATING FUEL ELEMENTS

The superheating fuel elements 76 in the center of the active portion 21 are almost identical in construction to the boiling fuel elements 74 and, hence, corresponding parts will be given the same reference numerals. Each of the superheating fuel elements is longer at its lower end to extend through the lower support grid 52 into the superheated steam plenum chamber 62, as shown in FIG. 5. The outer shroud 118 and lower inner shroud 161 each have a conical portion 165 and 165a, respectively, which adapt the fuel element for insertion into the adapter 88. Its open upper end is also longer, terminating appreciably above the level of the coolant-moderator in the reactor as shown in FIG. 1. The outer shroud 118 is fabricated of Zircaloy II with an outside diameter of 5.33 inches and a thickness of .040 inch in the region within the active portion.

The fuel pin assemblies within the superheating fuel elements 76 are identical to the assemblies 134 in the boiling fuel elements 74 (FIGS. 4 and 7) except for some of the dimensions and some of the materials from which they are fabricated and, therefore, are not separately illustrated in the drawings. There are 85 fuel pins 138 spaced on a hexagonal lattice by means of stainless steel support grids 140 with a distance of approximately .50 inch between centers. The fuel containing pellets 154 are approximately .322 inch in diameter and contain a ceramic mixture of 30% by volume uranium oxide and magnesium oxide. The uranium therein is enriched approximately 3%. Each fuel pin contains about 96.1 gms. of uranium so that the total uranium content of the superheating zone approximates 2650 kgs.

The tubes 153 surrounding the pellets 154 are stainless steel .010 inch thick, and the inner shroud 136 is .020 inch thick stainless steel. It will be noted that stainless steel has been substituted for Zircaloy II on those interior parts which come in contact with the superheated steam because of its noncorrosive properties. It will also be noted that the uranium content of the fuel elements in the superheating zone is substantially less than the fuel elements in the boiling zone. Because of the relatively lower heat transfer capabilities of dry or superheated steam it is essential that the neutron flux and thus the heat flux in this region be maintained below a level at which damage will occur to the fuel elements. Since the coolant-moderator is in the form of liquid or saturated steam as it passes through the boiling fuel elements, the heat transfer is greater, and higher neutron and heat fluxes may be used.

A more highly enriched uranium is used in the superheating elements to lengthen the recycle time of these elements. These elements reside in a zone of high neutron flux and thus their reduced uranium content are subject to a very fast burnup rate if they were not substantially enriched with U-235. Reducing the neutron and heat fluxes in the central part of the active core of the reactor reduces the power output which would otherwise be available. It is proposed as a refinement to the nuclear reactor herein disclosed to remove the superheating fuel elements to the periphery of the active portion and manifold the dry steam passing therefrom into the steam system. The boiling fuel assemblies in the center of the reactor as well as the outer superheating fuel elements may then all contain undiluted uranium and the highest power potentialities of the reactor may be realized.

CONTROL TUBES

The control tubes 50 are bottle-like cylinders 166 (FIG. 4), each having a bottom fitting 168 with a threaded extension 170 engaging a flanged adapter 172 secured to the lower grid 52, which tubes are adapted to contain control-moderator as hereinafter described. The upper end of the cylinder 166 reduces to a tube-like extension 176 above the upper support grid 46, said extension terminating in a hexagonally shaped vent cap 178 so that the inside of the control tube is subjected to the same pressure as the inside of the pressure vessel 22. A sleeve 180 having a flange 182 at its upper end surrounds the extension 176 and is longitudinally translatable thereon. At the bottom end of the sleeve 180 are six radially pivotable arms 184 which extend outwardly to support the surrounding fuel elements when the sleeve 180 is in its downward position. The arms 184 contact the spoked ring 186 threadedly engaging the tube-like extension 176 to force the arms 184 outward.

The bottom fitting 168 of the control tube is orificed and cooperates with a pipe 187 (FIG. 1) leading out of the reactor beneath the lower support grid 52 to introduce the control-moderator into the cylinder 166 from the control-moderator system hereinafter described. The bottle-like cylinders 166 of the control tubes 50 both in the boiling region and the superheating region are fabricated of Zircaloy II having an inside diameter of 8.50 inches and a .125 inch wall thickness.

SHIELDING

As hereinbefore stated, the reactor 20 is housed in a cell 24. As shown in FIG. 1 the cell 24 is lined with a five-inch thick water-cooled thermal shield 188 of steel and lead. Directly around the pressure shell 22 is a four-inch layer of stainless steel wool 190 which also serves as thermal insulation. The steel wool 190 is covered with an air-tight stainless steel sheathing 192.

The concrete shield 26, forming the cell 24 is nine-foot thick. Cooling coils are provided in the concrete shield to reduce thermal stresses when the reactor is operating.

REACTOR LOADING

The reactor is loaded and unloaded through the access ports 45 by means of a fuel handling tool 194 such as shown in FIG. 8 and described in the inventor's copending application Serial No. 585,582, filed May 17, 1956, now U.S. Patent No. 2,949,202. Each control port 45 is axially aligned with a control tube 50 and services that tube as well as the six fuel elements 48 immediately surrounding it. The fuel handling tool 194 serves to insert the fuel elements through the port corresponding to the control tube 50 with which it is associated. When the fuel element is within the pressure vessel it may be offset from the axis of the port to a position axially aligned with the fuel elements' position in the active portion and lowered therein. As described in the aforementioned copending application, the fuel handling tool 194 has a parallelogram linkage 196 which may be operated to its off center position indicated by the dash-dot outline 198, through the manipulation of the rod 200 in an upward direction by means of a cable or other means connected to the loop 202 at its upper end. It will be seen in the FIGS. 3 and 4 that the outer diameter of each fuel element 48 is substantially less than the distance between the confronting sides of adjacent triangles 108 in the hexagonal openings 104 of the upper grid framework 102 in which it resides. The ring 162 (FIG. 4) hereinbefore described surrounding the fuel element fits within the circular arc lock support 112 with fairly close tolerance so that the fuel element is prevented from falling towards the center of the hexagonal opening 104 when it is completely inserted into its position. With this arrangement the distance between the lower end of the access port and the upper support grid 46 may be held to a minimum distance less than the length of the fuel element, and the fuel element may be moved into alignment over its position when the parallelogram linkage 196 of the fuel handling tool 194 is clear of the bottom end of the access port.

The six fuel elements 48 fitting into one of the hexagonal openings 104 are first charged into the reactor, after which, a control tube 50 is lowered through its corresponding access port 45 into its central position and screwed into its adapter 172. The control tubes are handled by a special tool which is not shown, having a hexagonal socket to engage the hexagonal vent cap 178 and axially rotate the control tube to engage and disengage it from its adapter. The tool also has fingers which may engage the flange 182 on the sleeve 180 to manipulate the radially pivotal arms 184 which help maintain the fuel elements in their positions without falling towards the control element.

To unload the reactor the special tool is operated to lift the sleeve 180 to disengage the arms 184, turn the control tube to disengage the threads and remove it from the reactor through the access port. The fuel handling tool 194 is then inserted and extended to engage the desired fuel element. The tool along with the fuel element is then raised sufficiently high over the top of the lower adapter 78 so that it will have clearance in its downward swing as the tool is manipulated to axially align the fuel element with the access port and removed therethrough. Each access port serves one control rod and six surrounding fuel elements so that the number of ports is reduced. Large ports requiring large gaskets and many bolts are also undesirable. Therefore, in the disclosed arrangement the integrity of the pressure shell is maintained but fuel handling ease is not sacrificed.

CONTROL SYSTEM

The reactor disclosed herein is maintained at its operating level by the novel means wherein the voids within the coolant-moderator in the active portion are directly controlled. The increase in the void percentage, or decrease in the moderator to fuel volume ratio increases the average energy of the released neutrons. Thus, there is an increase in neutron leakage from the core as well as resonance absorption of neutrons in any fertile materials such as U–238 in the reactor. The number of neutrons available for subsequent fissioning is reduced causing the reactor power level to decrease.

The control system comprises the control tubes 50, of which one is shown in FIG. 8, connected at its bottom end through pipe means 187 to a cooler 216. The cooler 216 is connected to a control-moderator source 218 containing heavy water ($D_2O$) through pipe means 220, a reversible displacement pump 222, pipe means 224 and a valve 226. A level indicator 228 which is vented to the pressurized space above the coolant-moderator level in the pressure vessel is provided to directly read the level of the control-moderator in the control tube 50. The reversible displacement pump 222 may be controlled manually to maintain a desired control-moderator level within the control tube 50 or it may be operated automatically responsive to a device 230 associated with the level indicator 228 which converts the level indicator reading to electrical impulses to control the pump 222. A relief valve 232 bypasses the reversible displacement pump 222 for immediate discharge of the control-moderator from the active core in the event of a reactor excursion.

The cooler 216 insures that the control-moderator being removed from the active portion is in liquid form when it reaches the reversible displacement pump 222 or release valve 232 as it is being discharged. It is conceivable that the control-moderator in the tubes 50 might vaporize to some extent, and if it does the pump 222 and release valve 232 would be ineffective to discharge it.

The control system so far described is one means whereby the control-moderator level is maintained at a definite predetermined level corresponding to a calculated power level of the reactor desired. As the control-moderator level in the control tubes 50 varies, the level indicator 228 will detect the variation and electrical impulses will be sent to the reversible displacement pump 222 which will operate to either force more control-moderator into the control tube 50 or cause some to be discharged into the storage tank 218.

An alternate means for controlling the reactor operating level is provided which is responsive to the steam pressure built up within the pressure vessel. The pressure tank 234 is connected through a valve 236 to the pipe means 224. A bypass valve 238 is connected around the reversible displacement pump 222 between the pipe means 224 and 220. The pressure tank 234 contains control moderator held under pressure from a compressor (not shown) through valve 240 and the pressure indicator 242. It will be noted, as previously described, that the top of the control tubes 50 are vented so that the control-moderator within is subjected to the pressure built up within the reactor pressure vessel.

To control the reactor operating level, the pressure tank 234 is subjected to a predetermined pressure level corresponding with the desired reactor operating level. If the pressure within the reactor pressure shell is less than that in the pressure tank 234, the level of control-moderator within the control tubes 50 will rise, decreasing the void to moderator percentage or increasing the volume ratio of moderator to fuel thereby increasing the reactivity within the reactor. As the reactivity increases more heat is generated and the boiling coolant-moderator within the fuel elements causes the pressure in the reactor pressure vessel to increase until it equalizes the pressure of the control-moderator pressure tank 224.

The control tubes 50 may be individually controllable or they may be controlled in gangs by means of common connection manifolds. By providing individual control the neutron flux pattern in the different portions of the active core 21 may be varied to give any desired operating neutron flux pattern. If the control elements are ganged in groups the commonly connected control elements might best be arranged concentrically with the active portion of the reactor so that a relatively level neutron flux contour could be maintained.

In the particular reactor disclosed, it would be undesirable to connect all of the control tubes to a common manifold because of difficulties that would arise in loading and unloading the reactor. To change a control element or a fuel element the control-moderator within the control tubes would be drained and the particular control tube would then be removed from the reactor as hereinbefore described. As seen in FIG. 1 coolant-moderator from the tank 68 would then enter the control system and be distributed into the other control tubes if they were commonly connected which may then sufficiently reduce the moderator void to fuel ratio to initiate a chain reaction. Individual control of the tubes prevents this occurrence as would ganged control provided that the number of control tubes having a common connection is small enough that the rise of moderator therein would be insufficient to sustain a chain reaction.

Some of the control tubes 50 are used for shim control of the reactor, whereas, others are used for regulation as hereinbefore discussed. To compensate for fissionable fuel burnup, xenon poisoning, and other variable parameters the control-moderator level in some of the tubes can be varied.

The control tubes are also used to maintain a fairly even distribution of power across the reactor active portion. This condition is approached when the control cylinders are regulated in such a manner that the control-moderator level in the tubes farthest from the axis of the core is maintained as high as possible while the level in the centrally located tubes are depressed as much as required for control of criticality. The level of control-moderator in the superheating zone tubes of course is regulated in accordance with the dry steam temperatures.

In the present reactor described illustrating the claimed invention the control system, including the 55 control tubes 50, is capable of controlling between 12 to 14% $K_{eff}$. Between 10 to 12% $K_{eff}$ is controllable by the resonance absorption effect in the U-235. Another 2 to 3% results from the neutron leakage from the periphery of the active portion through the blanket formed by the excess coolant-moderator surrounding the active portion.

There is another factor affecting the control of reactivity which is difficult to calculate but which does add to the percentages stated above. The effect is generally termed "neutron streaming" and results from fast neutrons escaping or streaming from the ends of the control tubes when they are drained of control-moderator. If no moderator exists in a tube, fast neutrons may escape from both ends and be lost to the nuclear reaction. Partially filled tubes provide paths for fast neutrons through their upper ends in the same manner. These neutron losses serve to increase the control of reactivity of the system and thus add to its integrity as well as to the safety of operation of the reactor.

FEEDWATER AND STEAM CYCLE

With reference to FIGS. 1 and 8, the feedwater and steam cycle will hereinafter be discussed. Coolant-moderator 21a, which is heavy water ($D_2O$) in the particular embodiment herein described, is introduced into the reactor through the feedwater pipe 70 terminating at the bottom of the tank 68. The coolant-moderator overflows the tank 68 and flows to the bottom of the pressure vessel through the downcomer passages 72. It rises through the passages 86 in the adapters 78 and the orifices 128 and into the interior of the boiling fuel elements 74. The pressure vessel is filled with coolant-moderator to a level approximately two feet above the top of the active portion 21, the portion of coolant-moderator above said active portion serving as an upper blanket.

When the reactor is being operated, the water within the boiling fuel tubes is heated by the nuclear reaction and caused to rise by natural convection currents, while more coolant is supplied thereto from the coolant-moderator overflowing the tank and passing down through the downcomer passages to the bottom of the pressure shell. As the reactor is brought to operating reactivity and temperature level the coolant-moderator within the boiling fuel elements 74 begins to boil, the vapor formed thereby rising through the tops of the boiling fuel elements and into the steam chamber above the coolant-moderator level. It will be noted that the coolant-moderator entering the reactor through pipes 70 and filling the tank 68 is sufficiently cooled to prevent it from boiling until it reaches the interior of the boiling fuel elements 74. Thus the feedwater also prevents the control-moderator in the control tubes from boiling. As the pressure in the vessel builds up the saturated steam in the space above the coolant-moderator level is forced through the open tops of the superheating fuel elements 76 and forced downward therethrough into the central portion of the active core 21. The saturated steam passing through the active portion causes it to become superheated as it passes into the plenum 62 and the outlet pipe 64.

The superheated steam is fed to a turbogenerator 244 of standard design wherein the energy is utilized to generate electric power. The steam is then fed through a condenser 246 which converts it back to liquid form and returned to the reactor through pipe 70 by means of the feedwater pump 248.

A safety system is used in conjunction with the feedwater system in which a fluid containing boron, such as a solution of boric acid, is fed from a storage container 250 into the reactor through a valve 252 which is operable responsive to an abnormal reactivity increment rise. The boron in the feedwater will immediately absorb neutrons which are then unavailable for sustaining a nuclear reaction, causing the reactor to shut down.

The particular reactor described as one embodiment of the invention disclosed is designed to operate at a reactor power level of approximately 1000 megawatts with a generated electric power of approximately 325 megawatts. The steam exiting the reactor has a pressure of approximately 725 p.s.i.a. at a temperature of about 850° F. The steam cycle hereinbefore described has an efficiency of approximately 32.7%. The reactor produces steam at a rate of approximately 2,500,000 pounds per hour which is superheated about 340° F.

The following tables summarize the reactor details set forth herein.

Reactor data summary—operating data

| | |
|---|---|
| Type of fuel (ceramic) | Enr. $UO_2$ |
| Superheat of steam, ° F | 340 |
| Coolant circulation | Natl. Circl. |
| Reactor power level, t. mw | 1000 |
| Generated electric power, mw | 325 |
| $D_2O$ in reactor, short tons | 125 |
| Operating factor | .80 |
| Average $D_2O$ temperature within tank but outside shrouds, ° F | 165 |
| Exit steam pressure, p.s.i.a | 725 |
| Exit steam temperature, ° F | 850 |
| Steam cycle efficiency, percent | 32.7 |
| Maximum exit steam void in shrouds, percent | 74 |
| Maximum boiling heat flux (unflattened flux pattern), B.t.u./ft.² hr | 242,000 |
| Maximum surface temperature (superheater), ° F | 1200 |
| Steam production, lb./hr | 2,500,000 |
| Turbine exhaust moisture, unless intermediate dryers are used, percent | 10 |

DESIGN DATA FOR CSBR, $D_2O$ MODERATED, TANK TYPE BOILING REACTORS

| | |
|---|---|
| Pressure vessel, I.D., ft | 16 |
| Pressure vessel inside height, ft | 40 |
| Average core diameter, ft | 13.75 |
| Core height | 14 |
| Hexagonal lattice spacing of fuel columns, in | 8 |

Boiling zone:

| | |
|---|---|
| Number of fuel columns | 276 |
| Inside diameter of inner shroud, in | 6.20 |
| Thickness (Zr) of inner shroud, in | 0.2 |
| Thickness (Zr) of outer shroud, in | .04 |
| Outside diameter of outer shroud, in | 6.38 |
| Number of fuel pins per assembly | 85 |
| Lattice spacing of fuel pins, in | .60 (hex) |
| $UO_2$ fuel pin diameter (net), in | .31 |
| Zr clad thickness, in | .016 |
| Number of control cylinders | 48 |
| Control cylinder, I.D, in | 8.50 |
| Control cylinder Zr wall thickness, in | .125 |

Superheating zone:

| | |
|---|---|
| Location of superheating zone | Center of core |
| Number of fuel columns | 54 |
| Inside diameter of inner shroud, in | 5.15 |
| Thickness (stainless steel) of inner shroud, in | .020 |
| Thickness (Zr) of outer shroud, in | .040 |
| Outside diameter of outer shroud, in | 5.33 |
| Number of fuel pins per assembly | 85 |
| Lattice spacing of fuel pins, in | .50 (hex) |
| ($UO_2$+MgO) fuel pin diameter (net), in | .322 |
| Stainless steel clad thickness, in | .010 |
| Number of control cylinders | 7 |
| Control cylinder, I.D., in | 8.50 |
| Control cylinder Zr wall thickness, in | .125 |

FUEL LOADING DATA, CSBR, TYPE 800A

Boiling zone:

| | |
|---|---|
| Number of fuel columns | 276 |
| Uranium content in zone, kg | 41,810 |
| Uranium per fuel column, kg | 151.5 |
| Uranium per fuel pin, kg | .297 |
| Enrichment, U–235/U (atomic ratio) | 0.013 |
| U–235 content in zone, kg | 537 |
| U–235 per fuel column, kg | 1.95 |

Superheating zone:

| | |
|---|---|
| Number of fuel columns | 54 |
| Uranium volume ratio, $UO_2/(MgO+UO_2)$ | 0.30 |
| Uranium content in zone, kg | 2650 |
| Uranium per fuel column, kg | 49.0 |
| Uranium per fuel pin, kg | 0.0961 |
| Enrichment, U–235/U | 0.030 |
| U–235 content in zone, kg | 78 |
| U–235 per fuel column, kg | 1.44 |

Total fuel in reactor:

| | |
|---|---|
| Uranium content, kg | 44,460 |
| U–235 content, kg | 615 |

Although this specification describes a reactor forming one embodiment of the invention, it is contemplated that other means may be used for varying the moderator void to fuel volume ratio. It is conceivable that a liquid moderator different from that used as the coolant-moderator could be employed in the control tubes as long as it has moderating properties good enough to affect the moderator void to fuel volume ratio to control the reactivity. It is also conceivable that solid moderators such as graphite or beryllium in the form of rods could be used in the control tubes and mechanically translated therein in the same manner that absorber control rods are now used. The advantage of having no mechanical parts would be lost in such an arrangement, however it would maintain the extremely important advantage of neutron efficiency, in that the reactor would be controlled, not by the absorption of neutrons in a poison material but rather the increase of energy of the neutrons, so that the resonant absorption thereof in fertile materials residing in the active portion of the reactor is increased. It is the intention of the applicant not to be limited by the specific embodiments shown here, but only within the scope of the appended claims.

What is claimed is:

1. A neutronic reactor comprising a pressure shell, a plurality of fuel elements containing thermal neutron fissionable isotopes supported between an upper grid and a lower grid within said pressure shell, a plurality of spaced control tubes supported between said upper and lower grids, said fuel elements hexagonally arranged in groups of six surrounding a control tube, a steam-forming coolant-moderator contained within the pressure shell and surrounding each of said fuel elements and control tubes, the volume ratio of said coolant-moderator to said fissionable isotopes being insufficient to yield a neutron multiplication factor of unity, a liquid control-moderator within each of said control tubes, means for controllably varying the amount of control-moderator within said control tubes, the volume ratio of said coolant-moderator and said control-moderator to said fissionable isotopes being sufficient to yield a multiplication factor greater than unity and a negative reactivity to core void coefficient when said tubes are filled with control-moderator.

2. A neutronic reactor comprising a pressure shell, a plurality of fuel elements containing slightly enriched uranium supported between an upper grid and a lower grid within said pressure shell, a plurality of spaced control tubes supported between said upper and lower grids, said fuel elements hexagonally arranged in groups of six, each group surrounding a control tube, a heavy water coolant-moderator contained within the pressure shell and surrounding each of said fuel elements and control tubes, the volume ratio of said heavy water coolant-moderator to the said uranium being insufficient to yield a neutron multiplication factor of unity, a heavy water control-moderator within each of said control tubes, means for controllably varying the amount of heavy water control-moderator within said tubes, the volume ratio of said coolant-moderator in said control-moderator to said fissionable isotopes being sufficient to yield a multiplication factor greater than unity and a negative reactivity to core void coefficient when said tubes are filled with heavy water control-moderator.

3. A boiling neutronic reactor having a heavy water coolant-moderator; comprising an upright cylindrical pressure shell, an upper support grid disposed transversely across the midposition of the pressure shell, an essentially cylindrical tank below said upper grid in the pressure shell, the bottom of said tank serving as a lower support grid, means for introducing the coolant-moderator into said tank, said tank being open at its upper end and its periphery forming downcomer channels for coolant-moderator overflowing the tank, a plurality of equispaced control tubes vertically supported by said upper and lower grids within said tank said tubes having vents above the level of the coolant-moderator, a plurality of fuel elements having central passages and containing slightly enriched uranium, said fuel elements hexagonally arranged in groups of six surrounding each of said control tubes and supported by said upper and lower grids, a tubular member between the centermost portion of said lower grid and the bottom of said pressure shell, the inside of said tubular member comprising a superheated steam outlet plenum, the space defined by said lower grid, the pressure shell and the outside of said tubular member forming a coolant-moderator inlet plenum, the central passage of the outermost groups of fuel elements being connected to said coolant-moderator inlet plenum and adapted to convert coolant-moderator therewithin from liquid to saturated steam and to pass saturated steam into the space above the level of said heavy water coolant-moderator, the innermost fuel elements having their central passages connected to said superheated steam outlet plenum at their lower ends and adapted to superheat saturated steam passing therethrough to the outlet plenum; the volume ratio of the coolant-moderator to the uranium being insufficient to yield an effective neutron multiplication factor of unity; a heat exchanger connected to the lower ends of said control tubes, a heavy water control-moderator storage basin, and means for pumping control-moderator from said storage basin through said heat exchanger to said control tubes and maintaining a desired level of control-moderator in said control tubes; the volume ratio of the coolant-moderator and the control-moderator to the uranium being sufficient to yield an effective neutron multiplication factor greater than unity and a negative reactivity to core void coefficient when said control tubes are filled to the level of the coolant-moderator.

4. A boiling neutronic reactor having a heavy water coolant moderator comprising an upright cylindrical high carbon steel pressure shell having a 14-foot I.D. and a height of 40 feet, a stainless steel upper support grid disposed transversely across the midportion of the pressure shell, a tubular tank below said upper grid in the pressure shell, the bottom of said tank fabricated of stainless steel and serving as a lower support grid, means for introducing heavy water coolant-moderator into said tank, said tank being open at its upper end and fabricated of 3/16 inch Zircaloy II sheet to form downcomer channels for coolant-moderator overflowing the tank, 55 Zircaloy II control tubes each having an 8.5-inch I.D. vertically supported by said upper and lower grids within said tanks, 330 fuel elements having central passages and collectively containing 44,460 kg. of 1–3% enriched uranium, said fuel elements hexagonally arranged in groups of six surrounding each of said control tubes and supported by said upper and lower grids, said fuel elements and control tubes forming a geometric lattice with 3-inch center-to-center distance, a tubular member between the centermost portion of said lower grid and the bottom of said pressure shell the inside of which comprises a superheated steam outlet plenum, the space defined by said lower grid, the pressure shell and the outside of said tubular member forming a coolant-moderator inlet plenum, the central passages of said outermost groups of fuel elements being connected to said coolant-moderator inlet plenum and adapted to convert coolant-moderator therewithin from liquid to saturated steam and pass saturated steam into the space above the level of said heavy water coolant-moderator, the central passages of said innermost fuel elements connected at their lower ends to said superheated steam outlet plenum and adapted to superheat saturated steam passing therethrough to the outlet plenum, the volume ratio of the coolant-moderator to the uranium being insufficient to yield an effective neutron multiplication factor of unity, a heat exchanger connected to the lower ends of said control tubes, a heavy water control-moderator storage basin, reversible positive displacement pumps connected between said heat exchanger and said storage basin and quick opening valves connected around said pumps, said valves responsive to a predetermined excess reactivity for quickly discharging the control-moderator from said tubes, the volume ratio of the coolant-moderator and the control-moderator to the uranium being sufficient to yield an effective neutron multiplication factor greater than unity and a negative reactivity to core void coefficient when said control tubes are filled to the level of the coolant-moderator.

5. A boiling neutronic reactor having a heavy water coolant-moderator; comprising an upright cylindrical pressure shell, an upper support grid disposed transversely across the midposition of the pressure shell, an essentially cylindrical tank below said upper grid in the pressure shell, the bottom of said tank serving as a lower support grid, means for introducing the coolant-moderator into said tank, said tank being open at its upper end and its periphery forming downcomer channels for coolant moderator overflowing the tank, a plurality of equispaced control tubes vertically supported by said upper and lower grids within said tanks said tubes having vents above the level of the coolant-moderator, a plurality of fuel elements having central passages and containing slightly enriched uranium, said fuel elements hexagonally arranged in groups of six surrounding each of said control tubes and supported by said upper and lower grids, a tubular member between the centermost portion of said lower grid and the bottom of said pressure shell, the inside of said tubular member comprising a superheated steam outlet plenum, the space defined by said lower grid, the pressure shell and the outside of said tubular member forming a coolant-moderator inlet plenum, the central passages of said outermost groups of fuel elements being connected to said coolant-moderator inlet plenum and adapted to convert coolant-moderator therewithin from liquid to saturated steam and to pass saturated steam into the space above the level of said heavy water coolant-moderator, the central passages of said innermost fuel elements connected at their lower ends to said superheated steam outlet plenum and adapted to superheat saturated steam passing therethrough to the outlet plenum; the volume ratio of the coolant-moderator to the uranium being insufficient to yield an effective neutron multiplication factor of unity; a heat exchanger connected to the lower ends of said control tubes, a heavy water storage tank containing heavy water at a pressure related to the desired operating level of the reactor, pipe means connecting said tank to said control tubes; the volume ratio of the coolant-moderator and the control-moderator to the uranium being sufficient to yield an effective neutron multiplication factor greater than unity and a negative reactivity to core void coefficient when said control tubes are filled to the level of the coolant-moderator.

References Cited in the file of this patent

UNITED STATES PATENTS

| | | |
|---|---|---|
| 2,787,593 | Metcalf | Apr. 2, 1957 |
| 2,852,456 | Wade | Sept. 16, 1958 |
| 2,938,845 | Treshow | May 31, 1960 |

FOREIGN PATENTS

| | | |
|---|---|---|
| 753,130 | Great Britain | July 1956 |
| 1,158,320 | France | Jan. 20, 1958 |

OTHER REFERENCES

Nucleonics, vol. 13 (July 1955), pp. 34–35 (article by Untermyer); vol. 14 (April 1956), pp. 106, 108, 109; vol. 15 (July 1957), pp. 60–64 (article by Harrer).

Atomic Energy Commission Document: TID–7532 (pt. 1), Reactor Control Meeting Held in Los Angeles, March 6–8, 1957, October 1957, pages 188–201.